United States Patent [19]
Poitevin et al.

[11] 3,974,258
[45] Aug. 10, 1976

[54] PROCESS FOR PURIFYING A SULFUR DIOXIDE CONTAINING GAS

[75] Inventors: Jean-Pierre Poitevin, Marly-le-Roi; Claude Dezael, Maisons-Laffitte, both of France

[73] Assignee: Institut Francaise du Petrole, des Carburants et Lubrifiants et Entreprise de Recherches et d'Activities Petrolieres Elf, Rueil-Malmaison, France

[22] Filed: June 20, 1974

[21] Appl. No.: 481,238

[30] Foreign Application Priority Data
June 26, 1973 France .............................. 73.23417

[52] U.S. Cl. ............................ 423/242; 204/180 P; 423/574 L
[51] Int. Cl.² ......................................... C01B 17/00
[58] Field of Search ........................... 423/242–244, 423/352, 235, 567 A, 574 G, 356, 512; 204/180 P

[56] References Cited
UNITED STATES PATENTS

| | | | |
|---|---|---|---|
| 3,523,755 | 8/1970 | McRae | 423/243 |
| 3,654,603 | 4/1972 | McRae | 423/243 |
| 3,833,715 | 9/1974 | Deschamps et al. | 423/242 |
| 3,839,549 | 10/1974 | Deschamps et al. | 423/242 |

Primary Examiner—Oscar R. Vertiz
Assistant Examiner—Gregory A. Heller
Attorney, Agent, or Firm—Millen, Raptes & White

[57] ABSTRACT

A sulfur dioxide containing gas is purified by successive contact with an ammonia solution and then a dilute ammonium sulfite solution; the latter solution is regenerated by electrodialysis while the ammonia solution, after SO₂ absorption, is vaporized in order to recover ammonia and sulfur dioxide.

11 Claims, 1 Drawing Figure

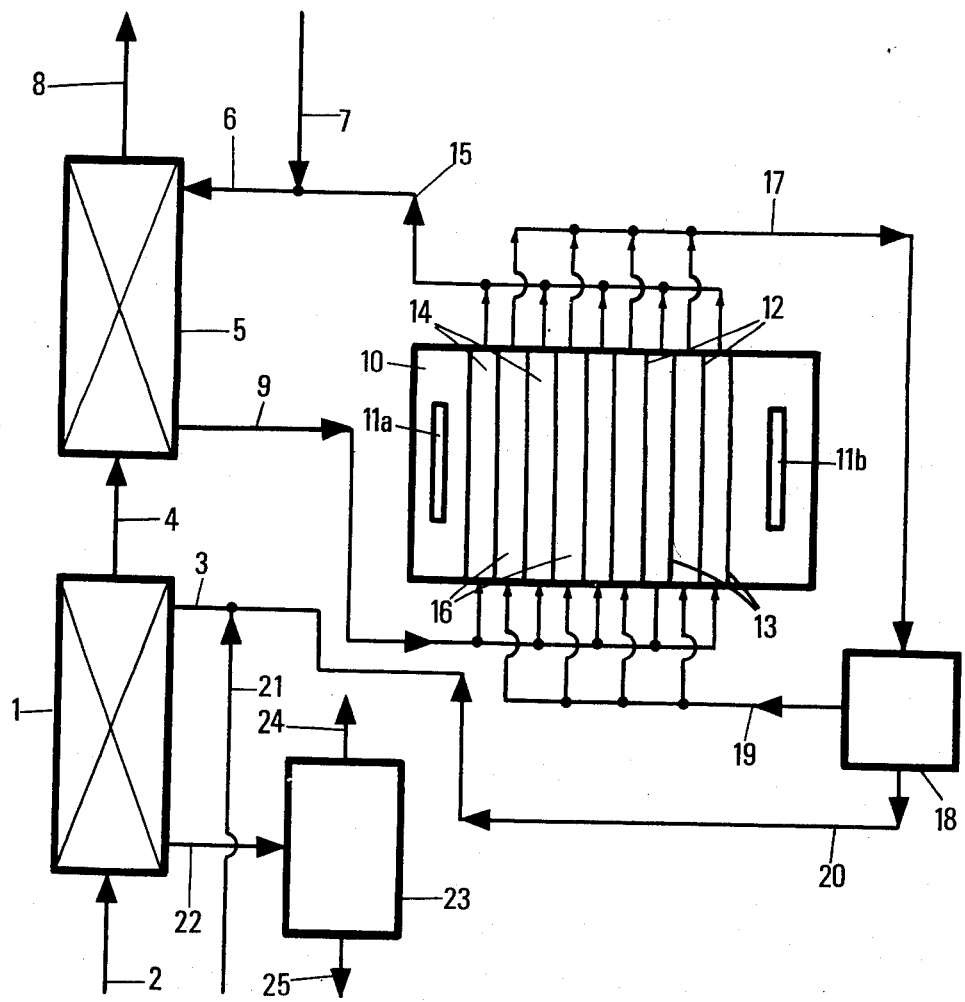

PROCESS FOR PURIFYING A SULFUR DIOXIDE CONTAINING GAS

The invention relates to a process for purifying an industrial gas containing sulfur dioxide using aqueous ammonia solutions as scrubbing agents.

The invention also relates to the removal of residual sulfur dioxide and ammonia from industrial gases which have been predominantly purified by means of aqueous ammonia solutions in a preceding step.

It is known that many industrial gases, particularly the off-gases from power plants and some off-gases from chemical plants, contain sulfur dioxide and sometimes sulfur trioxide which strongly pollute the atmosphere. Their treatment with aqueous ammonia or ammonium sulfite solutions is an efficient way to purify them, while producing aqueous solutions of ammonium salts of oxygen and sulfur containing acids, which solutions may be easily converted to sulfur, a material which can be stored easily, creates no pollution and can be used in industry.

Small amounts of sulfur dioxide and ammonia remaining exhaust gas can produce a plumer at the stack outlet. This plume can be reduced or suppressed by sufficient reheating of the evolved gas, but this would be an expensive operation.

The amounts of sulfur dioxide and ammonia are usually not in excess of 300 ppm by volume for each component; they are often from 30 to 250 ppm by volume.

These partially purified gases may be nearly completely freed of their impurities by water washing, yielding amnonium sulfite solutions, which are however too dilute to be efficiently treated by thermal decomposition, so as to recover $SO_2$ and $HN_3$, as proposed, for example, in the French Pat. No. 2,128,955.

This invention aims to provide treatment of concentration by electrodialysis of these dilute sulfite solutions. It also concerns the removal of sulfur dioxide contained in an industrial gas by means of aqueous ammonia solutions.

The process comprises (1) contacting the gas with an aqueous ammonia solution, so as to absorb sulfur dioxide and form and ammonium sulfite solution (A), (2) contacting the gas discharged from step (1) with a dilute aqueous ammonium sulfite solution (B), so as to absorb residual sulfur dioxide and ammonia and provide a gas practically free of sulfur dioxide an an ammonium sulfite solution (C), the (3) treating the solution (C) by electrodialysis in at least one multi-stage electrodialysis cell comprising a plurality of membranes alternatively cation-exchanging and anion-exchanging, placed in an electric field, so as to produce a relatively concentrated solution (D) of said salts and a dilute solution (E) which is used to constitute the absorption solution (B) of step (2), and finally treating the concentrated solution (D) and the solution (A) from step (1) in a known manner, so as to convert them to sulfur dioxide, ammonia and water, the ammonia being separated from the sulfur dioxide and recycled to step (1).

The gases treated according to the invention contain, for example, from 0.05 to 10 % by volume of $SO_2$.

The impure gas is freed of the major part of its sulfur dioxide content by contacting it with an aqueous ammonia absorption solution. The latter contains ammonia and/or ammonium sulfite $(NH_4)_2SO_3$; its normality expressed as $NH_3$ or $NH_4$ is, for example, 0.1 N – 10 N and preferably 1 N – 5 N. The temperature in the absorption column may range from 0° to 100°C, usually from 40° to 60°C. The so partially purified gas containing small amounts of $SO_2$ and $NH_3$ is contracted with a highly dilute aqueous ammonium sulfite solution. During the contact between the aqueous solution and the gas, sulfur dioxide and ammonia dissolve and yield in the resulting solution a mixture of $(NH_4)_2SO_3$ and $NH_4HSO_3$ in proportions dependent on the nature of the treated gas. Relatively larger amounts of the washing solution may be used and the freed rate is such as to result in a very low concentration of ammonium sulfite in the resulting solution, usually from 0.02 to 0.5 mole per liter, preferably about 0.05 mole per liter.

The contact between the partially purified gas and the very dilute solution of ammonium sulfites is preferably carried out in an apparatus distinct from that used for the preliminary purification of the gas with aqueous ammonia solutions. A multi-stage column may also be used, provided the scrubbing according to the invention is carried out in the upper portion thereof with a liquid discharge at the bottom of this upper portion.

The temperature at the end of the purification step (1) is about 40°–70°C, usually 50°C, i.e. close to the dew point of the waste gas. This temperature may also be used for the step (2) of the invention and can be kept unchanged. A slight cooling in this zone, however, facilitates the condensation of the liquid carried along in the form of droplets and improves the scrubbing effect.

The solutions obtained in (2) must be concentrated in order to recover sulfur dioxide and ammonia.

According to the invention, the solution is passed through an electrodialyzer.

The further diluted solution recovered at the outlet of the electrodialyzer is practically free of ammonium sulfites, the content of which is usually reduced to less than 0.015 mole per liter; the resultant diluted solution is recycled to the scrubbing zone used for treating the partially purified gas. Water is supplied to maintain constant the volume of the washibg solution circulated in this zone.

The sulfite content of the concentrated solution obtained at the outlet of the electrodialyzer may range, for example, from 0.5 to 5 moles per liter; it is usually about 1–3 moles per liter. The salts contained therein may now be decomposed to sulfue dioxide and ammonia, for example by heating.

This concentrated solution may be, and is preferably admixed with the solution obtained in (1), when washing the impure gas by means of an ammonia absorption solution whose ammoniun sulfite content is usually higher than 200 g per liter and may be as high as 600 g per liter.

The electrodialyzer comprises a plurality of compartments separated with selective membranes which are alternatively cation-permeable or anion-permeable; it is provided with electrodes at its ends.

It is operated as follows : the compartments are fed in appropriate manner, for example by feeding each second compartment with the solution to be treated. The $SO_3^{--}$, $HSO_3^-$ and $NH_4^+$ ions are displaced through the respectively anion-exchanging and cation-exchanging membranes and there is obtained, at the outlet of the fed compartment, a solution of reduced ion content and, at the outlet of the vicinal compartments, a solution of increased ion content.

We thus obtain the very dilute and concentrated ammonium sulfite solutions, as hereinbefore mentioned.

The membranes which can be used according to the invention are preferably heterogenous membranes, such as usually obtained by molding fine particles of ion exchange resins in sheets of thermoplastic materials, such as, for example, polyethylene or polyvinyl chloride, or on a collodion base. Their thickness is sufficiently low as to avoid excessive electric resistance, but they are mechanically strong and it has been found that they have high ionic selectivity.

The membrane permeable to cations preferably comprise a sulfonic acid resin while the membranes permeable to anions preferably comprise a quaternary ammonium salt resin.

The electrodes are so selected as to be corrosion-resistant. The current densities are usually from 0.2 to 2 Amperes per $dm^2$ and preferably about 1 Ampere per $dm^2$.

The electric voltage usually applied to each cell (one anionic membrane + one cationic membrane) is from 0.5 to 1.5 volt and preferably 1 volt.

The liquid feeding rates of the electrodialyzer are selected according to the surface of the membrane and the concentration of the sulfitic solution, so as to avoid excessive polarization.

A better efficiency is achieved by using electrodialysis cells of the recirculation type rather than of direct passage type. Very good results have also been obtained by treating the solutions in batchwise-operated apparatuses.

The sulfite solutions obtained in (1) and (3) (a concentrated solution) are then treated in a known manner for conversion to ammonia, sulfur dioxide and water, for example by heating or by steam-stripping.

Sulfur dioxide is then admixed with hydrogen sulfide and converted, for example, in an organic medium, to sulfur, and ammonia is re-used to constitute the absoprtion solution of (1). These techniques have been described, for example, in the French Pat. No. 1,568,748.

According to the process of the invention, gases practically free of impurities are rejected to atmosphere.

The attached drawing and the following example are given for purposes of illustration, not limitation.

100,000 $Nm^3$ (i.e. under normal conditions of temperature and pressure) per hour of waste gas containing 2,000 ppm by volume of $SO_2$ are treated, in an absorption tower 1, with an aqueous ammonia solution whose normality, expressed as $NH_4OH$, is about 10 N. The gas is fed through line 2 and the absorption solution through line 3.

The gas discharged through stack 4 is supplied to tower 5 where it is further scrubbed to remove residual impurities, i.e. 200 ppm of $SO_2$ and 260 ppm of $NH_3$ by volume.

The aqueous wash water of very low ammonium sulfite content is supplied to tower 5 from line 6 fed with additional water through line 7, so that a temperature of about 50°C is maintained in the tower; the injection rate is about 20 $m^3$ per hour.

The purified gas, which is rejected to atmosphere through stack 8, contains only 18 ppm of $SO_2$ and 23 of $NH_3$ by volume.

The resulting solution is discharged from the tower 5 through line 9; it contains about 0.05 mole of ammonium sulfite per liter. It is fed to an electrodialyzer 10 provided with corrosion resisting electrodes 11 $a$ and 11 $b$, respectively a cathode and an anode, cation-exchanging membranes 12 and anion-exchanging membranes 13.

The solution discharged from the impoverishment compartments 14 of the electrodialyzer through line 15 is fed through line 6 to column 5. The solution discharged from the concentration compartments 16 through line 17 is fed to a tank 18.

This solution is recycled at least once at a flow rate close to that of the solution to be treated (line 9) through line 19 to the concentration compartments 16.

A portion of the solution is discharged through line 20; its ammonium sulfite content corresponds to 0.8 kmole of $SO_2$ and 1 kmole of $NH_3$ and it is fed to line 3 which also receives through line 21 an ammonia solution containing the ammonia recovered in the further steps of the process (not shown in the drawing).

The composition of the ammonia absorption solution recovered through line 22, at the bottom of tower 1, is 8.8 kmoles of $SO_2$, 10.6 kmoles of $NH_3$ and 61.6 kmoles of $H_2O$ per hour. It is treated in evaporator 23, so as to recover therefrom $SO_2$ and $NH_3$ through pipe 24.

This effluent gas is then contacted with $H_2S$, preferably in an organic medium, so as to produce sulfur, which is separated, and ammonia which is re-used for manufacturing the absorption solution.

An aqueous solution is discharged through line 25; it contains the unvaporized ammonium sulfites and, in some cases, ammonium sulfates which may be treated in a known manner, so as to reduce them and obtain an effluent gas containing $SO_2$ and $NH_3$ which meets that issued through line 24.

What we claim is:

1. A process for efficiently purifying a sulfur dioxide containing gas, which comprises the steps of
   1. contacting said sulfur dioxide containing gas with an aqueous ammonia absorption solution in a first absorption zone to absorb the major part of said sulfur dioxide, thereby obtaining an ammonium sulfite solution (A) and an effluent gas containing residual sulfur dioxide and ammonia, and separating said solution (A) from said effluent gas,
   2. contacting said separated effluent gas with a dilute aqueous ammonium sulfite solution (B) in a second absorption zone to absorb residual sulfur dioxide and ammonia thereby producing an ammonium sulfite solution (C) and a gas practically free of sulfur dioxide and ammonia, and
   3. electrodialyzing the solution (C) in at least one multi-stage electrodialysis cell comprising a plurality of alternatively cation-permselective and anion-permselective membranes, thereby producing a relatively concentrated ammonium sulfite solution (D) and a dilute ammonium sulfite solution (E), separately recovering each of the solutions (D) and (E), and recycling solution (E) to step (2) to constitute at least a portion of the absorption solution (B).

2. A process according to claim 1, wherein the gas which has been purified in step (1) and which is supplied to step (2) contains from 30 to 300 ppm by volume of sulfur dioxide and from 30 to 300 ppm by volume of ammonia.

3. A process according to claim 1, wherein the aqueous solution (B) of step (2) and the dilute ammonium sulfite solution (E) of step (3) has an ammonium sulfite content of 0 – 0.015 mole per liter.

4. A process according to claim 3, wherein the contact of step (2) is continued until the ammonium sulfite concentration of solution (C) reaches 0.02 – 0.5 mole per liter.

5. A process according to claim 1, wherein the aqueous ammonia solution of step (1) contains ammonia or ammonium sulfite at a normality, calculated as $NH_3$ or $NH_4$, of from 0.1 N to 10 N.

6. A process according to claim 5, wherein the contact of step (1) is continued until the ammonium sulfite concentration of solution (A) ranges from 200 to 600 g per liter.

7. A process according to claim 1, wherein the aqueous ammonium sulfite solution (C) is so concentrated, in the electrodialysis zone, as to obtain a concentration of the solution (D) of 0.5 – 5 moles per liter of ammonium sulfites.

8. A process according to claim 1, wherein the cation-exchange membranes of the electrodialysis zone contain a sulfonic acid resin.

9. A process according to claim 1, wherein the anion exchange membranes of the electrodialysis zone contain a quaternary ammonium salt resin.

10. A process according to claim 1, wherein the concentrated aqueous ammonium sulfite solution (D) discharged from the electrodialysis zone is used to constitute a portion of the absorption solution of step (1).

11. A process according to claim 1, wherein at least one of the ammonium sulfite solutions (A) and (D) is vaporized to produce a gas containing sulfur dioxide and ammonia, said gas is reacted with hydrogen sulfide, thereby producing sulfur and an ammonia containing gas of reduced sulfur dioxide content, and said ammonia containing gas of reduced sulfur dioxide content is supplied to step (1) for contact with the sulfur dioxide containing gas.

* * * * *

UNITED STATES PATENT AND TRADEMARK OFFICE
CERTIFICATE OF CORRECTION

PATENT NO. : 3,974,258
DATED : August 10, 1976
INVENTOR(S) : POITEVIN ET AL.

It is certified that error appears in the above-identified patent and that said Letters Patent are hereby corrected as shown below:

[73] should read --

Assignee: INSTITUT FRANCAIS DU PETROLE
                    RUEIL-MALMAISON
           FRANCE ----.

Signed and Sealed this

Twenty-eighth Day of December 1976

[SEAL]

Attest:

RUTH C. MASON
*Attesting Officer*

C. MARSHALL DANN
*Commissioner of Patents and Trademarks*